United States Patent [19]

Patel et al.

[11] Patent Number: 4,751,256

[45] Date of Patent: Jun. 14, 1988

[54] AQUEOUS EPOXY RESIN CAN COATING COMPOSITIONS

[75] Inventors: Hirendra K. Patel; Ronald Golden, both of Louisville, Ky.

[73] Assignee: Interez, Inc., Ga.

[21] Appl. No.: 819,956

[22] Filed: Jan. 21, 1986

[51] Int. Cl.$^4$ .................. C08L 63/00; C08L 63/02; C08L 61/10; C08L 33/02
[52] U.S. Cl. .................. 523/412; 523/100; 523/409; 525/109
[58] Field of Search .............. 525/109; 523/100, 412, 523/409

[56] References Cited

U.S. PATENT DOCUMENTS

| 3,118,848 | 1/1964 | Lombardi | 523/413 |
| 3,121,068 | 2/1964 | Baum | 525/109 |
| 3,943,187 | 3/1976 | Wu | 525/109 |
| 4,212,781 | 7/1980 | Evans et al. | 260/29.4 UA |
| 4,247,439 | 1/1981 | Matthews et al. | 260/29.6 NR |
| 4,289,811 | 9/1981 | Shelley, Jr. | 427/239 |
| 4,442,246 | 4/1984 | Brown et al. | 523/404 |
| 4,446,260 | 5/1984 | Woods | 523/412 |
| 4,477,609 | 10/1984 | Aluotto | 523/412 |
| 4,547,535 | 10/1985 | Brown | 523/412 |
| 4,579,888 | 4/1986 | Kodama | 523/100 |

FOREIGN PATENT DOCUMENTS

| 59-11369 | 1/1984 | Japan | 523/412 |
| 2068967 | 10/1983 | United Kingdom . | |

OTHER PUBLICATIONS

Whitehouse, *Phenolic Resins,* pp. 6–9, Iliffe Books, London, 1967.

*Primary Examiner*—C. Warren Ivy
*Attorney, Agent, or Firm*—Herbert P. Price

[57] ABSTRACT

Heat curable coating compositions particularly suitable as coatings for metal can ends are made from aqueous dispersions of epoxy resins, acrylic resins which are copolymers of polymerizable acids and other monomers, and alkylated phenol novolac resins.

7 Claims, No Drawings

AQUEOUS EPOXY RESIN CAN COATING COMPOSITIONS

BACKGROUND OF THE INVENTION

The field of art to which this invention pertains is aqueous epoxy resin/acrylic acid copolymer dispersions useful as can coating compositions.

In the manufacture of metal containers, a thin protective synthetic resin coating is applied to the interior of the container to prevent contact of the metal surface of the can with its contents. Such coatings ideally should have good adhesion to the interior metal surface, low extractables to prevent contamination of the container contents, and a rapid cure or drying rate for economy of container manufacture. Synthetic resin coating compositions which have been used for a number of years include organic solutions of vinyl resins, polybutadiene resins, epoxy resins, aminoplast and phenolplast resins and oleoresinous materials.

In order to reduce the use of organic solvents, efforts have been made to convert the coating compositions to water-borne systems. One such system is described in U.S. Pat. No. 4,247,439 wherein a blend of an epoxy resin, an acrylic copolymer which contains carboxylic acid groups and a tertiary amine are dispersed in water.

Another approach to an aqueous coating composition is described in U.S. Pat. No. 4,289,811. Acrylic or methacrylic acid is copolymerized with other monomers in the presence of an aminoplast resin followed by the addition of an epoxy resin and an amine. The resulting blend is then dispersed in water.

In U.S. Pat. No. 4,212,781, acrylic or methacrylic acid is copolymerized with another monomer in the presence of an epoxy resin, a glycidyl polyether of a dihydric phenol. Some of the resulting copolymer forms a graft polymer with the backbone of the epoxy resin, graft polymer and acrylic acid copolymer, which is then neutralized with an amine and dispersed in water.

U.S. Pat. No. 4,442,246 describes sanitary can coating compositions made from the reaction product of an acid copolymer and a partially terminated epoxy resin, neutralized with an amine and dispersed in water.

In U.K. Pat. No. 2,068,967, epoxy resins are partially reacted with acrylic acid copolymers and the reaction product is neutralized with an amine and dispersed in water to form coating compositions.

Water-borne epoxy resin coting compositions, such as those described above, have replaced organic solvent-borne coatings in many can coating applications. However, none of these coatings has been found to be adequate replacements for modified polyvinyl chloride organosol coatings for use as "non-repair" coatings for can ends. Can ends, such as "easy open" beer and beverage can ends, are fabricated from pre-coated metal. The coating must have good flexibility and toughness in order to withstand the rigors of fabrication such as forming and seaming.

SUMMARY OF THE INVENTION

This invention is directed to aqueous epoxy/acrylic resin dispersions useful as can coatings. In particular, this invention pertains to aqueous epoxy/acrylic resin dispersions modified with a phenol novolac resin. Even more particularly, this invention relates to dispersions of epoxy/acrylic resin modified with an alkylated phenol novolac resin.

The compositions of this invention comprise
(A) about 40 to about 88 weight percent epoxy resin wherein the epoxy resin is a glycidyl polyether of a dihydric phenol having an epoxide equivalent weight of about 180 to about 5000;
(B) about 10 to about 40 weight percent acrylic resin wherein the resin is a copolymer of a polymerizable ethylenically unsaturated carboxylic acid and another monomer polymerizable therewith, said resin containing about 5 to about 45 weight percent, based on the weight of acrylic resin, of polymerizable acid; and
(C) about 2 to about 20 weight percent of an alkylated phenol novolac resin having a molecular weight of about 1000 to about 4000 wherein the alkyl group of the novolac resin contains 8 to 12 carbon atoms.

The weight percents of epoxy resin, acrylic resin and novolac resin are based on the total weight of epoxy resin, acrylic resin and novolac resin.

When neutralized with ammonia or an amine, the resinous compositions can be dispersed in water to form stable dispersions which are readily formulated into coating compositions. The addition of the alkylated phenol novolac resin to the composition increases the flexibility and toughness of the coating, making it suitable for the precoating of metal which is to be fabricated.

DESCRIPTION OF THE INVENTION

The epoxy resins useful in this invention are glycidyl polyethers of dihydric phenols and contain more than one 1,2-epoxide group per molecule. Such epoxy resins are derived from an epihalohydrin and a polyhydric phenol and have epoxide equivalent weights of about 180 to about 5000. Examples of epihalohydrin are epichlorohydrin, epibromohydrin and epiiodohydrin with epichlorohydrin being preferred. Dihydric phenols are exemplified by resorcinol, hydroquinone, p,p'-dihydroxydiphenyl propane (or Bisphenol A as it is commonly called), p,p'-dihydroxydiphenyl, p,p'-dihydroxydiphenyl methane, p,p'-dihydroxydiphenyl ethane, bis(2-hydroxynaphthyl)methane, 1,5-dihydroxy naphthalene and the like. Bisphenol A is the preferred dihydric phenol. The preferred epoxy resin for use in this invention has an epoxide equivalent weight of about 1500 to about 3000.

The acrylic resin useful in this invention is a carboxyl-function polymer which is prepared by conventional free radical polymerization processes from at least one polymerizable, ethylenically unsaturated carboxylic acid monomer and at least one polymerizable, ethylenically unsaturated monomer free of acid groups. Suitable polymerizable carboxylic acid monomers include acrylic acid, methacrylic acid, crotonic acid, itaconic acid, maleic acid or anhydride, fumaric acid, the monoesters of the dicarboxylic acid monomers, such as methyl hydrogen maleate or ethyl hydrogen fumarate, and the like.

Suitable polymerizable, ethylenically unsaturated monomers free of acid groups are vinyl aromatic compounds and alkyl esters of polymerizable ethylenically unsaturated carboxylic acids. Examples of such monomers include styrene, halostyrenes, vinyl toluene, vinyl naphthalene, and methyl, ethyl, propyl, butyl, hexyl, ethylhexyl and lauryl acrylates, methacrylates and crotonates, dimethyl maleate, dibutylfumarate and the like. Mixtures of these monomers can also be used.

Other suitable polymerizable, ethylenically unsaturated monomers include vinyl chloride, acrylonitrile, methacrylonitrile, vinyl acetate, vinyl propionate, vinyl stearate, isobutoxymethyl acrylamide and the like.

The preferred monomers are styrene, methyl acrylate, ethyl acrylate, butyl acrylate, acrylic acid and methacrylic acid. The most preferred are styrene, ethyl acrylate and acrylic acid.

The acrylic resin should contain about 5 to about 45 weight percent polymerizable acid and, preferably, about 20 to about 40 weight percent. The acid number of the resin will generally be within the range of about 180 to about 300. The molecular weight of the acrylic acid will range from about 1000 to about 12,000.

The novolac resins useful in this invention are those made from alkylated phenols and formaldehyde. Novolac resins are made by reacting the phenol with formaldehyde under acid conditions. The resulting resins have the phenol moieties linked together through methylene bridges. The resins contain no methylol groups. The alkylated phenol novolac resins useful in this invention have alkyl groups which contain about 8 to about 12 carbon atoms. Examples of such alkyl groups are 2-ethylhexyl, nonyl, decyl, undecyl and dodecyl with nonyl being preferred. A portion of the $C_8$ to $C_{12}$ alkyl phenol novolac resin can, advantageously, in some instances, be replaced with up to 10 weight percent, based on the total weight of the novolac resin, of a novolac resin which contains no alkyl substituents or wherein the alkyl group contains one to seven carbon atoms, i.e., $C_0$ to $C_7$ alkyl substituents. Examples of phenols from which such novolac resins can be made are phenol, cresol, ethyl phenol, tertiary butyl phenol, ditertiary butyl phenol and the like. The novolac resins useful in this invention have molecular weights of about 250 to about 5000 and, preferably, about 1500 to about 3000.

Organic solvents which can be used in preparing the compositions of this invention are, preferably, those which are substantially water-miscible, either in the form of a single polar compound or as a mixture which can include non-polar constituents. Suitable organic solvents, either alone or in admixture, include diisobutyl ketone, methyl propyl ketone, methyl isobutyl ketone, hydroxyethyl acetate, 2-ethoxyethyl acetate, propylene glycol monomethyl ether, propylene glycol monoethyl ether, ethylene glycol monopropyl ether, ethylene glycol monobutyl ether, ethylene glycol, diethylene glycol, propylene glycol, butylene glycol, diethylene glycol monobutyl ether, n-propanol, isopropanol, n-butanol, t-butanol, amyl alcohol, cyclohexanol and the like. Non-polar solvents which can be included as a minor constituents of the organic solvent component include aliphatic and aromatic hydrocarbons such as naphtha, heptane, hexane, mineral spirits, toluene, xylene and the like.

In order to obtain water dispersible resins, the carboxylic acid groups of the acrylic resin must be partially or completely neutralized with ammonia or an amine which is volatile in the film under curing conditions. Examples of such amines are ethylamine, butylamine, dimethylamine, diisopropylamine, dimethylethylamine, benzylamine, ethanolamine, diethanolamine, triethanolamine, methyldiethanolamine, dimethylethanolamine, N-methyl morpholine, and the like. Generally, about 0.4 to about 0.9 equivalent of ammonia or amine are used for each equivalent of acid in the acrylic resin.

Aminoplast resins or epoxidized oils can be used in the compositions of this invention as flow control agents or as thermosettable modifiers. Low molecular weight polyesters (molecular weights of about 500 to about 5000) can be added to improve flow properties.

In preparing the compositions of this invention, the epoxy resin, novolac resin and acrylic resin are dissolved in a water-miscible solvent, an amine is then added to salt the acid groups in the acrylic resin and then water is added to form a dispersion.

The amounts of epoxy resin, novolac resin and acrylic resin used in the compositions of this invention are: about 40 to about 88 weight percent, preferably, about 50 to about 80 weight percent, epoxy resin; about 10 to about 40 weight percent, preferably, about 15 to about 35 weight percent, acrylic resin; and about 2 to about 20 weight percent, preferably, about 3 to about 10 weight percent, novolac resin. The weight percentages are based on the total weight of epoxy resin, acrylic resin and novolac resin.

The water and organic solvent are present in the compositions of this invention in the following amounts based on the weight of water and organic solvent: about 12.6 to about 32.6 weight percent organic solvent and about 67.4 to about 87.4 weight percent water. The preferred amounts are about 17.6 to about 27.6 weight percent organic solvent and about 62.4 to about 82.4 weight percent water.

The solids content, i.e., the weight percent epoxy resin, acrylic resin and novolac resin in the coating composition, will vary from about 20 to about 50 weight percent and, preferably, about 25 to about 40 weight percent.

The coating compositions of this invention are useful as coating compositions for the interior of aluminum and steel cans, but are particularly useful for the ends or closures of such cans. The can ends are coated by roll coat applications to a dry thickness of about 1.5 to about 12 milligrams/square inch. The coatings are cured by heating in ovens to metal temperatures of 340° F. to 500° F. The total residence time in the ovens will vary from about 2 seconds to about 12 minutes.

The coatings on metal sheets which are to be fabricated into can ends, particularly can ends which contain easy opening tabs, are cured by two different processes. One process, called the sheet bake process, involves coating metal sheets having dimensions of about 36 inches by 36 inches. These sheets are then placed upright in racks and are placed in ovens for about 7 to about 12 minutes at peak metal temperatures of about 350° to about 400° F. The other process is coil coating. Enormous rolls of thin gage steel or aluminum are unwound, coated, heat cured and rewound. The total heating time in the oven is about 8 to about 30 seconds with peak metal temperatures reaching about 450° to about 475° F.

In other applications, i.e, as metal primer coatings, the coating compositions are cured at a temperature of about 300° F. to about 500° F. for a time sufficient to obtain a cure. The coating compositions can be formulated into clear coatings or into pigmented coatings. Other additives which can be incorporated into the coating compositions are coalescing solvents, leveling agents, wetting agents, dispersions of other resins, water soluble resins, thickening agents, suspending agemts. surfactants, defoamers, adhesion promoters, corrosion inhibitors, colorants and the like.

The cured coating compositions of this invention are evaluated by the following tests:

ENAMEL RATER

The Enamel Rater test is used to determine the amount of metal exposure (measured in milliamperes) after the coated metal has been fabricated into beverage can ends. This test is conducted using a Waco Enamel Rater with an Enamel Rater end-cup attachment. The end-cup, which contains an electrode, is filled about half way with a 1% electrolyte solution. The end to be tested is placed on the cup with the coated side towards the inside of the cup. The cup is then rotated so that the electrolyte solution is in contact with the coated end. The electrode in the cup should be covered by the electrolyte solution. The other electrode is placed in contact with the uncoated side of the end. A 12 volt potential is applied between the two electrodes. Any current leakage is measured in milliamperes. A reading of 0 to 25 ER average is excellent; 25 to 50 is good; 50 to 75 is borderline; 75 to 100 is poor; and over 100 is failure.

FEATHERING

This test is used to check for frilling along the edge of the opening after the pull-tab has been removed. Coated ends are placed in a water bath heated to 180° F. with the tab side down for 10 minutes. After 10 minutes, the ends are removed and wiped dry with a lint-free towel to remove excess water. The tab is then pulled loose and the edges of the opening are observed for coating frilling, i.e., loss in adhesion or uneven tearing of the coating. The coatings are rated according to the following scale:
10: Perfect
9–8: Trace to Slight Failure
7: Slight Failure
6–5: Moderate Failure
4–0: Failure

RED STAIN

This method is used to determine the stain resistance of carbonated beverage coatings to Big Red soda. Coated ends are placed in an appropriate container and are covered completely with Big Red soda. The container is then placed in a 180° F. water bath for 30 minutes. After 30 minutes, the ends are washed with tap water and are rated according to the following scale:
10: No Stain
0: Maximum Stain

COPPER SULFATE TEST

This test is used to determine the severity of metal exposure on ends after they have been subjected to Enamel Rating. The ends are placed in an appropriate container and copper sulfate solution is poured over them. After one minute in the solution, the ends are removed and washed thoroughly in lukewarm tap water. The ends are then rated for metal exposure detected by brown deposits on the rivet, rivet floor, score and other areas. The ratings scale is:
0: No Failure
1: Slight Failure
2: Moderate Failure
3: Severe Failure

PACK TEST

This method is used to indicate the carbonate beverage pack resistance on ends. Coated ends are placed in an appropriate container and are completely covered with Tab soda. The container is then sealed and stored for 72 hours at 120° F. The ends are then rinsed with tap water and Enamel Rater tests are run on the ends.

MEK RESISTANCE

This test is conducted to determine the solvent resistance of the cured coatings. The coatings are rubbed with a cloth saturated with methyl ethyl ketone. The resistance is determined by the number of double rubs required to dissolve the coatings.

PASTUERIZATION

This test is used to determine the adhesion and blush resistance of coatings after being submitted to hot water. The coated can ends are placed in 180° F. water for 10 minutes. They are then removed from the water dried and cross-hatched by a scribe with at least 3 vertical and 3 horizontal lines. No. 610 Scotch brand cellophane tape is firmly placed over the cross-hatched area and is then pulled straight up from the surface of the panel. Adhesion is measured by the amount of coating which remains on the panel. The blush resistance of the coatings is also determined by observing coatings 5 minutes after removal from the water. Blushing is a milky discoloration or haze in the film, generally uniform over the whole area but sometimes blotchy or spotty.

The following examples are presented to more clearly define the invention. Parts and percentages, unless otherwise designated, are parts and percentages by weight.

EXAMPLE 1

To a suitable reactor were added 23.75 parts of a glycidyl polyether of bisphenol A having an epoxide equivalent weight of 2300, 2.82 parts of n-butanol, 1.21 parts of ethylene glycol monobutyl ether, and 1.09 parts of diethylene glycol monobutyl ether. Heat was applied to dissolve the glycidyl polyether. When solution was obtained and with the temperature at 201° F., 1.32 parts of a nonyl phenol novolac resin having a molecular weight of 1900 to 3000, a melting point of 97° C., and a Gardner-Holdt viscosity of L at 25° C. and at 64% solids in toluene were added. After 10 minutes, 14.29 parts of an acrylic resin made from 45 weight percent styrene, 21.14 weight percent ethyl acrylate and 33.86 weight percent acrylic acid at 55% solids in a mixture of water, n-butanol and ethylene glycol monobutyl ether were added along with 1.25 parts of a diethylene glycol adipic acid polyester having a Gardner-Holdt viscosity at 25° C. of $Z_1$ to $Z_3$. After 1 hour at 200° F., 2.4 parts of 2-dimethylethanolamine were added over a 15 minute period. After 30 minutes, heat was removed and slow addition of deionized water was begun. 45 parts of deionized water were added in 20 minutes with the temperature dropping to 145° F. After 1 hour, the temperature was 95° F. and the dispersion was very thick. After 40 minutes, an additional 6.86 parts of deionized water were added. Stirring was continued for 45 minutes to complete the dispersion. The resulting coating composition had a viscosity of 62 seconds #4 Ford Cup, a solids content of 34.08, and a weight per gallon of 8.79 pounds.

A coating composition prepared as described above was applied to aluminum panels at a thickness of 8-10 milligrams/square inch. After a 10 minute take at 380° F., the coating exhibited a solvent resistance of 44 methyl ethyl ketone double rubs and had excellent film continuity with little or no metal exposure after fabrication into easy opening aluminum can ends. The average Enamel Rater reading was 9.2 (standard deviation of 5).

Enamel Rater readings for coatings made as described above, but using other phenol novolac resins in the same amount as described above were as follows:

| Phenol Novolac | Enamel Rater | Standard Deviation |
| --- | --- | --- |
| None | 125+ | 0 |
| None | 51.9 | 30.9 |
| Phenol | 31.9 | 15.8 |
| Cresol | 64.4 | 25.3 |
| Butyl Phenol | 98.9 | 27.2 |
| Butyl Phenol | 39.9 | 17.1 |
| Octyl Phenol | 29.8 | 15.3 |
| Nonyl Phenol | 9.2 | 5 |
| Dodecyl Phenol | 27.2 | 9.1 |
| Butyl Phenol | 36.7 | 19.2 |

EXAMPLE 2

Using the same procedure as described in Example 1, a number of coating compositions were prepared using different phenol novolac resins in the amount of 4 weight percent based upon the total weight of epoxy resin, novolac resin and acrylic resin. Films were prepared on aluminum substrates at a film weight of 7 to 8 milligrams per square inch. The coatings were baked for 1 to 5 minutes at a peak metal temperature of 470° F. The coated aluminum was then fabricated into easy opening can ends. The coatings were then tested and evaluated as shown in the following table:

| Phenol in Novolac Resin | Enamel Rater Average | Standard Deviation | Feathering | MEK Resistance | Pasteurization Blush | Pasteurization Adhesion | Red Stain | Copper Sulfate | Pack Test Enamel Rater Average | Pack Test Enamel Rater Standard Deviation |
| --- | --- | --- | --- | --- | --- | --- | --- | --- | --- | --- |
| Phenol | 6 | 6 | 5-6 | 12 | 8-9 | 10 | 7 | Good | 54 | 41 |
| t-Butyl Phenol | 3 | 1.3 | 5 | 12 | 8 | 10 | 6 | Good | 40 | 24 |
| Octyl Phenol | 3 | 2 | 6-7 | 15 | 10 | 10 | 9-10 | Fair-Good | 53 | 19 |
| Nonyl Phenol | 3 | 1.5 | 7-8 | 14 | 10 | 10 | 9-10 | Excellent | 69 | 35 |
| Dodecyl Phenol | 1.3 | 1 | 6-7 | 13 | 10 | 10 | 6-10 | Excellent | 62 | 32 |

EXAMPLE 3

A coating composition was prepared using the same procedure and components as described in Example 1 except a portion of the nonyl phenol novolac resin was replaced with novolac resins described in the following table. The coatings were applied to aluminum substrates at 7 to 9 milligrams per square inch and were baked 90 seconds at 485° F. The coated aluminum was then fabricated into easy opening can ends and the coatings were evaluated as described in the following table:

| Nonyl Phenol Novolac Modification | Enamel Rater Average | Feathering | Red Stain | MEK Resistance | Pack Test Enamel Rater Average |
| --- | --- | --- | --- | --- | --- |
| 5 wt. % t-Butyl | 2.6 | 5-9 | 10 | 13 | 60 |
| 10 wt. % t-Butyl | 2.7 | 4-4 | 10 | 10 | 50.8 |
| 15 wt. % t-Butyl | 4.6 | 4-4 | 9-10 | 13 | 55.0 |
| 5 wt. % Di-t-Butyl | 3.5 | 4-7 | 10 | 7 | 32.5 |
| 10 wt. % Di-t-Butyl | 3.6 | 4-5 | 10 | 10 | 50.0 |
| 15 wt. % Di-t-Butyl | 3.2 | 4-5 | 10 | 7 | 52.5 |
| 5 wt. % Di-t-Butyl | 3.6 | 5-5 | 10 | 13 | 30.0 |
| 5 wt. % t-Butyl 5 wt. % Di-t-Butyl | | | | | |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A heat curable aqueous coating composition comprising an aqueous dispersion of an ammonia or amine salted resinous composition comprised of:
   a. about 40 to about 88 weight percent epoxy resin;
   b. about 10 to about 40 weight percent acrylic resin; and
   c. about 2 to about 20 weight percent alkylated phenol novolac resin, said weight percents being based on the total weight of (a), (b) and (c), wherein the epoxy resin is a glycidyl polyether of a dihydric phenol having an epoxide equivalent weight of about 180 to about 5000, wherein the acrylic resin is a copolymer of a polymerizable ethylenically unsaturated carboxylic acid monomer and a comonomer copolymerizable therewith, said comonomer being free of acid groups wherein the polymerizable acid is present in about 5 to about 45 weight percent based on the total weight of the acrylic resin, wherein the acrylic resin has a molecular weight of about 1000 to about 12,000, wherein the alkyl group in the alkylated phenol novolac resin contains about 8 to about 12 carbon atoms and wherein the novolac resin has a molecular weight of about 1,500 to about 5,000 and is free of methylol groups.

2. The composition of claim 1 wherein up to about 10 weight percent of the novolac resin is replaced with a novolac resin which contains from 0 to 7 carbon atoms in an alkyl group substituent on the aromatic ring.

3. The composition of claim 2 wherein the epoxy resin is the glycidyl polyether of bisphenol A having an epoxide equivalent weight of about 1500 to about 3000.

4. The composition of claim 2 wherein the acrylic resin is a copolymer of styrene, ethyl acrylate and acrylic acid.

5. The composition of claim 4 wherein the acrylic acid is present in the acrylic resin in the amount of about 20 to about 40 weight percent.

6. The composition of claim 2 wherein the novolac resin is a nonyl phenol novolac resin.

7. The composition of claim 2 wherein the epoxy resin is present in the amount of about 50 to about 80 weight percent, wherein the acrylic resin is present in the amount of about 15 to about 35 weight percent, and wherein the novolac resin is present in the amount of about 3 to about 10 weight percent.

* * * * *